United States Patent Office 3,286,570
Patented Nov. 22, 1966

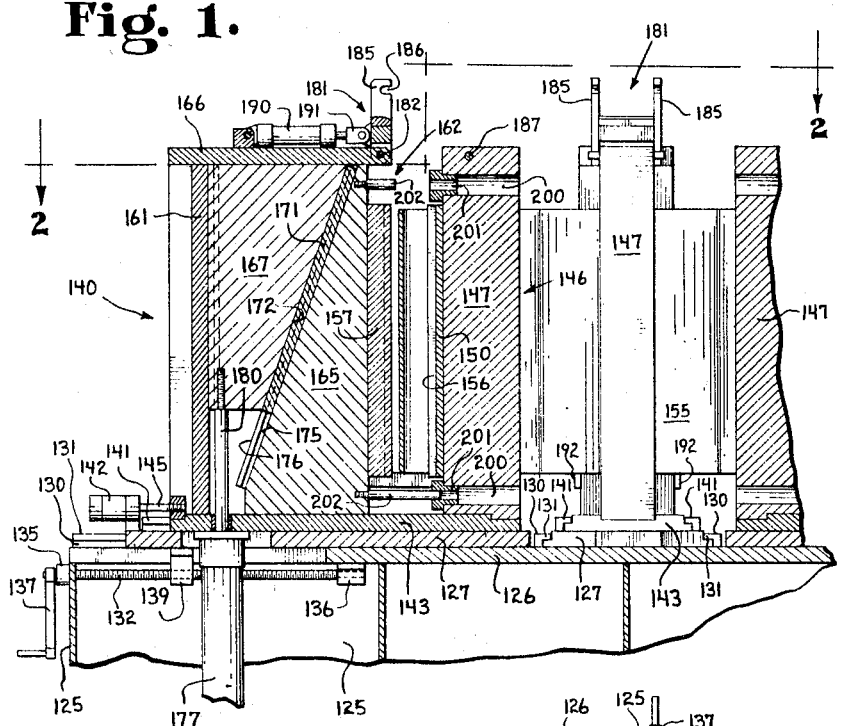

3,286,570
APPARATUS FOR FORMING METALLIC SHEET MEMBERS
Ralph E. Roper, Indianapolis, Ind., assignor to Wallace Expanding Machines, Inc., Indianapolis, Ind., a corporation of Indiana
Original application Feb. 23, 1962, Ser. No. 175,152, now Patent No. 3,222,910. Divided and this application Feb. 12, 1965, Ser. No. 438,157
5 Claims. (Cl. 83—184)

The present invention relates to forming apparatus particularly adapted for splitting a cluster of parts formed in an annular workpiece.

In my copending application Serial No. 175,152 now Patent Number 3,222,910, of which this is a divisional application, there is disclosed an apparatus for forming a cluster of parts in an annular workpiece. After the cluster of parts has been formed by the apparatus of that patent, it is necessary to separate the individual parts in the cluster. It is, therefore, an important object of the present invention to provide apparatus for splitting the individual parts in such a cluster.

Another object of the present invention is to provide improved forming apparatus.

A further object of this invention is to provide a splitting apparatus incorporating means for holding the workpiece in correct relation to the apparatus during splitting thereof.

Related objects and advantages will become apparent as the description proceeds.

The full nature of the invention will be understood from the accompanying drawings and the following description and claims.

FIG. 1 is a fragmentary vertical section through cutting apparatus embodying the present invention.

FIG. 2 is a fragmentary horizontal section taken along the line 2—2 of FIG. 1 in the direction of the arrows but showing the device in a different operating position.

Referring more particularly to FIGS. 1 and 2, the splitter apparatus comprises vertical supporting structure 125 having a cross shaped base plate 126 fixed to the upper ends thereof. For cutter assembly support plates 127 are slidably mounted for horizontal radial movement with relation to the axis of the splitter apparatus by means of L-shaped cross section guide members 130 fixed to the base 126. Each of the guides 130 has an inwardly projecting portion 131 which extends over its respective support plate 127 and retains the support plate between the guides 130.

A threaded adjusting rod 132 is provided for radially adjusting the position of each support plate 127 and is rotatably mounted at one end upon the vertical supporting structure 125 and at the other end upon the base 126 by means of suitable bearing elements 135 and 136 fixed to the structure 125 and the base 126, respectively. The bearing elements 135 and 136 include suitable means for retaining the rod 132 against axial movement. At the outward end of each rod 132, there is fixed a crank 137 for rotating the rod. Each of the support plates 127 has a depending element 139 fixed thereto and threadedly receiving the rod 132. It can be appreciated that the support plate 127 may be adjusted as to radial position by rotating the rod 132 by means of the crank 137. Normally, the support plate 127 will be adjusted for a particular type of part and will remain in the adjusted position until manufacture of that type of part has been completed at which time the tooling of the splitter apparatus as well as the positions of the support plates 127 are converted over to a new part.

A cutter assembly 140 is mounted for radial horizontal movement upon each of the support plates 127 by means of L-shaped cross section guides 141 fixed to the support plates 127 and extending over the base plate 143 of each cutter assembly.

A fluid motor 142 is fixed to each support plate 127 and has its piston rod 145 fixed to the base 143 of the cutter assembly 140. Anvil structure 146 is fixed to each of the cutter assembly base plates 143 and extends upwardly therefrom. The anvil structure includes a die carrier 147 and an anvil die 150 fixed to the outer surface of the die carrier 147. Each anvil die 150 has an outwardly facing die face 151 shaped identically to that portion of the inner surface 152 of the workpiece 155 which is adjacent to the area to be cut. In the center of each anvil die 151, there is an indentation 156 which extends the complete length of the die and has a shape corresponding to the cutter die 157. Because the anvil die face 151 is shaped identically to the workpiece, the anvil die structure 146 is used to position the workpiece prior to the cutting operation. This positioning function is accomplished by actuating the fluid cylinders 142 to retract their piston rods 145 and move the cutter assemblies 140 radially outwardly causing the anvil faces 151 to engage the workpiece at the areas 152 and position the workpiece for the cutting operation.

Each of the cutter assemblies further includes vertical side plates 160 and a rear or outer vertical plate 161 all of which are fixed to the base plate 143 of the assembly and define a three-sided enclosure for the cutter die structure 162. The cutter die structure includes a die carrier 165 and the cutter die 157 fixed to the inner face of the die carrier. The cutter die structure 162 is guided for radial horizontal movement by means of the base 143, the side members 169 and a top member 166 fixed to the side members 160 and the outer member 161.

A cam member 167 is received between the outer member 161 and the die carrier 165 and is guided for vertical movement by means of L-shaped guides 170 fixed to the outer member 161. The cam member 167 has a T-shaped key 171 fixed to its cam face 172 and received within a T-shaped groove 175 in the cam face 176 of the die carrier 165. A fluid motor 177 is fixed to the base 143 of each cutter assembly 140 and has its piston rod 180 fixed to the cam member 167. It can be seen that retraction and projection of the piston rod 180 will move the cam member 167 vertically in opposite directions and will move the die carrier 165 radially inwardly and outwardly.

A latch element 181 is pivoted at 182 to the top member 166 of each cutter assembly 140 and includes a pair of arms 185, each of which has an indentation 186 receivable upon a pair of pins 187 which extend oppositely from each of the anvil structures 146. The latch element 181 may be swung into and out of engagement with the pins 187 by means of fluid motors 190 each of which are pivoted at one end to the respective top members 166 and have their piston rods 191 pivoted to the latch elements 181.

Each of the cutter assemblies 140 has an inwardly projecting workpiece support 192 fixed thereto. Each anvil die carrier 147 has a pair of bores 200 within which are mounted pin guides 201 which slidably receive guide pins 202 fixed to the die carriers 165. The pins 202 and guides 201 insure that the dies 156 and 157 are maintained centered during the splitting operation.

After the workpiece has been dropped into the splitter apparatus and rests upon the workpiece supports 192, the latching elements 181 may be swung into engagement with the pins 187, thus locking the upper ends of each anvil structure 146 against horizontal movement with respect to respective top members 166. Thus, the latching elements 181 function to retain the anvil structures rigidly in position so that the cutter dies 157 have a firm back-up member against which to cut. After the latching elements 181 have been properly secured to the pins 187 and the anvils 147 are moved outwardly to properly position the workpiece, each fluid motor 177 may be operated to move the cam 167 of each cutter assembly downwardly to cut the scrap areas 79 and to separate the expanded parts (see the above-mentioned Patent 3,222,910) making up the workpiece 158. Preferably, the cutter dies 157 and anvil dies 150 are each formed so that a pair of notches is produced in each scrap portion 79, these notches assisting in positioning the separated parts in their respective trim die apparatus.

After the parts have been thus separated, the cams 167 are raised by actuation of the fluid motors 177 and each of the cutter dies 157 is retracted outwardly away from the workpiece. The separated parts are then free to be conveyed away upon conventional conveyors 120. After the arms 185 have been raised by the fluid motors 190, the anvil structures 146 are moved inwardly by fluid motors 142 in readiness for a further workpiece by actuation of the fluid motors 142.

From the above description, it will be evident that the present invention provides an improved apparatus for splitting a cluster of parts formed in an annular workpiece into parts such as automobile fenders, doors, bonnets and other sheet metal parts. It will also be clear that the present invention provides improved splitter apparatus for use with the expander apparatus of my Patent 3,222,910. By use of the apparatus of the present invention in combination with the expander of my Patent 3,222,910, the structural strength of the final part is increased and lighter gauge metal can be used in the parts. Because of the multiple parts formed by each expansion of the closed workpiece, speed of production and storage procedure are greatly improved as compared to toggle press operation wherein each stamping produces only a single part. It has also been found that the present expanding and splitting procedure permits precise forming of parts such as automobile doors and fenders and that this preciseness greatly exceeds anything known in conventional toggle press procedure, eliminates guesswork and permits formation of parts to very narrow tolerances.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. Apparatus for splitting a cluster of parts formed in an annular workpiece comprising a base, a plurality of cutter assembly support members slidably mounted on said base for horizontal radial movement, means for adjustably fixing the horizontal radial position of said support members with respect to said base, a cutter assembly slidably mounted on each of said support members for horizontal radial movement, a fluid motor fixed to each of said support members and having a fluid piston connected to the respective cutter assembly slidably mounted thereon for radial movement of each assembly, each cutter assembly comprising a base and an anvil structure fixed to said assembly base and extending upwardly therefrom, said anvil structure having a radially outwardly facing surface having the same shape as the workpiece adjacent the desired cut, a cutter die structure slidably mounted on each assembly base for horizontal radial movement and cooperating cutting action with said anvil structures, vertically extending side and outer members fixed to each assembly base and defining a three-sided inwardly opening enclosure for each cutter die structure, a top member fixed to said side and outer members, a latch pivoted to said top member and swingable into latching engagement with said anvil structure for locking the upper end of said anvil structure against horizontal movement relative to said enclosure, a cam member vertically movable between each outer member and cutter die structure, each cam member and cutter die structure having cooperating outwardly and downwardly sloping cam surfaces whereby downward movement of said cam member moves said cutter die structure inwardly toward said anvil structure, said cam surfaces being keyed together whereby upward movement of said cam member moves said cutter die structure outwardly, and a fluid motor having its piston fixed to said cam member for vertical movement thereof.

2. Apparatus for splitting a cluster of parts formed in an annular workpiece comprising a base, a plurality of cutter assembly support members slidably mounted on said base for horizontal radial movement, means for adjustably fixing the position of said support members with respect to said base, a cutter assembly slidably mounted on each of said support members for horizontal radial movement, means for radially moving each assembly relative to its support member, each cutter assembly comprising a base and an anvil structure fixed to said assembly base and extending upwardly therefrom, said anvil structure having an outwardly facing surface having the same shape as the workpiece adjacent the desired cut, a cutter die structure slidably mounted on each assembly base for horizontal radial movement and cooperating cutting action with said anvil structures, and means for radially moving each cutter die structure relative to its cutter assembly.

3. The apparatus of claim 2 additionally comprising vertically extending side and outer members fixed to each assembly base and defining a three sided inwardly opening enclosure for each cutter die structure, a top member fixed to said side and outer members, and a latch pivoted to said top member and swingable into latching engagement with said anvil structure for locking the upper end of said anvil structure against horizontal movement relative to said enclosure.

4. Apparatus for splitting a cluster of parts formed in an annular workpiece comprising a base, a plurality of cutter assemblies slidably mounted on said base for horizontal radial movement, means for radially moving each cutter assembly relative to said base, each cutter assembly comprising an assembly base and an anvil structure fixed to said assembly base and extending upwardly therefrom, said anvil structure having a die surface having the same shape as the workpiece adjacent the desired cut, a cutter die structure slidably mounted on each assembly base for horizontal radial movement and cooperating cutting action with said anvil structure die surface means for radially moving each cutter die structure relative to its cutter assembly, vertically extending elements each fixed to a respective one of said assembly bases, and means for fixedly connecting the upper end of each vertically extending element to the upper end of the respective anvil structure mounted on the same assembly base for supporting the upper end of said anvil structures against horizontal movement during cutting.

5. Splitting apparatus comprising a base, a plurality of cutter assembly support members slidably mounted on said base for horizontal radial movement, means for adjustably fixing the position of said support members with respect to said base, a cutter assembly slidably mounted on each of said support members for horizontal radial movement, means for radially moving each assembly relative to its support member, each cutter assembly comprising a base and an anvil structure fixed to said assembly base and extending upwardly therefrom, said anvil structure having a die surface which has the same shape as the workpiece adjacent the desired cut, a cutter die structure slidably mounted on each assembly base for horizontal radial movement and cooperating cutting action with said anvil structure die surface, and means for radially moving each cutter die structure relative to its cutter assembly.

References Cited by the Examiner

UNITED STATES PATENTS 2,329,020   9/1943   Wales _____ 83—184

WILLIAM W. DYER, JR., *Primary Examiner.*

L. B. TAYLOR, *Assistant Examiner.*